United States Patent
Farhat et al.

(10) Patent No.: US 7,240,112 B2
(45) Date of Patent: *Jul. 3, 2007

(54) SERVICE QUALITY MONITORING PROCESS

(75) Inventors: Jay Farhat, Foster City, CA (US); Alla Rozenfeld, San Carlos, CA (US); Singam Sunder, San Jose, CA (US)

(73) Assignee: iPass Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/126,008

(22) Filed: May 9, 2005

(65) Prior Publication Data

US 2005/0204036 A1    Sep. 15, 2005

Related U.S. Application Data

(63) Continuation of application No. 10/318,968, filed on Dec. 13, 2002, now Pat. No. 6,985,945, which is a continuation of application No. 09/732,800, filed on Dec. 7, 2000, now Pat. No. 6,510,463.

(60) Provisional application No. 60/207,670, filed on May 26, 2000.

(51) Int. Cl.
    *G06F 15/173* (2006.01)
(52) U.S. Cl. .................................... 709/224
(58) Field of Classification Search ............ 709/224
    See application file for complete search history.

(56) References Cited

U.S. PATENT DOCUMENTS

| | | |
|---|---|---|
| 4,811,249 A | 3/1989 | Marsh |
| 5,202,921 A | 4/1993 | Herzberg |
| 5,331,574 A | 7/1994 | Temoshenko |
| 5,412,723 A | 5/1995 | Canetti |
| 5,446,680 A | 8/1995 | Sekiya |
| 5,497,421 A | 3/1996 | Kaufman |
| 5,564,017 A | 10/1996 | Corn et al. |

(Continued)

FOREIGN PATENT DOCUMENTS

EP    0905615 A2    3/1999

(Continued)

OTHER PUBLICATIONS

Schneier, B., "Applied Cryptography", *Protocols, Algorithms, and Source Code in C*, Second Edition, John Wiley and Sons,(1996),185-187.

(Continued)

*Primary Examiner*—David Y. Eng
(74) *Attorney, Agent, or Firm*—Schwegman, Lundberg, Woessner and Kluth P.A.

(57) ABSTRACT

A method and system are provided for monitoring service quality of at least one network connection point of a remote network connection service. The method includes establishing a network connection between a client device and the remote network connection service via the network connection point. The network connection point may be one of a plurality of remotely located network connection points via any one of which access to the remote network connection service is obtainable. The method includes monitoring access performance of the network connection point to generate access performance data, and processing the access performance data thereby to monitor the service quality of the network connection point.

73 Claims, 6 Drawing Sheets

U.S. PATENT DOCUMENTS

| | | | |
|---|---|---|---|
| 5,606,663 | A | 2/1997 | Kadooka |
| 5,611,048 | A | 3/1997 | Jacobs et al. |
| 5,638,514 | A | 6/1997 | Yoshida et al. |
| 5,726,883 | A | 3/1998 | Levine et al. |
| 5,768,521 | A | 6/1998 | Dedrick |
| 5,781,189 | A | 7/1998 | Holleran et al. |
| 5,793,952 | A | 8/1998 | Limsico |
| 5,802,592 | A | 9/1998 | Chess et al. |
| 5,815,665 | A | 9/1998 | Teper et al. |
| 5,832,228 | A | 11/1998 | Holden et al. |
| 5,845,267 | A | 12/1998 | Ronen |
| 5,852,812 | A | 12/1998 | Reeder |
| 5,892,900 | A | 4/1999 | Ginter et al. |
| 5,991,292 | A | 11/1999 | Focsaneanu et al. |
| 6,023,470 | A | 2/2000 | Lee et al. |
| 6,023,502 | A | 2/2000 | Bouanaka et al. |
| 6,026,375 | A | 2/2000 | Hall et al. |
| 6,028,917 | A | 2/2000 | Creamer et al. |
| 6,029,143 | A | 2/2000 | Mosher et al. |
| 6,032,132 | A | 2/2000 | Nelson |
| 6,032,137 | A | 2/2000 | Ballard |
| 6,035,281 | A | 3/2000 | Crosskey et al. |
| 6,047,051 | A | 4/2000 | Ginzboorg et al. |
| 6,049,671 | A | 4/2000 | Slivka et al. |
| 6,055,503 | A | 4/2000 | Horstmann |
| 6,078,906 | A | 6/2000 | Huberman |
| 6,081,508 | A | 6/2000 | West et al. |
| 6,094,721 | A | 7/2000 | Eldridge et al. |
| 6,112,239 | A | 8/2000 | Kenner et al. |
| 6,125,354 | A | 9/2000 | MacFarlane et al. |
| 6,128,601 | A | 10/2000 | Van Horne et al. |
| 6,157,618 | A | 12/2000 | Boss et al. |
| 6,167,126 | A | 12/2000 | Janning |
| 6,175,869 | B1 | 1/2001 | Ahuja et al. |
| 6,178,460 | B1* | 1/2001 | Maddalozzo et al. ........ 709/239 |
| 6,188,994 | B1 | 2/2001 | Egendorf |
| 6,189,096 | B1 | 2/2001 | Haverty |
| 6,198,824 | B1 | 3/2001 | Shambroom |
| 6,208,977 | B1 | 3/2001 | Hernandez et al. |
| 6,212,280 | B1 | 4/2001 | Howard, Jr. et al. |
| 6,212,561 | B1 | 4/2001 | Sitaraman et al. |
| 6,216,117 | B1 | 4/2001 | Hall |
| 6,219,790 | B1 | 4/2001 | Lloyd |
| 6,240,091 | B1 | 5/2001 | Ginzboorg et al. |
| 6,243,367 | B1* | 6/2001 | Hussain ..................... 370/329 |
| 6,247,050 | B1* | 6/2001 | Tso et al. ................... 709/224 |
| 6,260,142 | B1 | 7/2001 | Thakkar et al. |
| 6,269,401 | B1 | 7/2001 | Fletcher et al. |
| 6,278,460 | B1* | 8/2001 | Myers et al. ............... 345/424 |
| 6,317,792 | B1 | 11/2001 | Mundy et al. |
| 6,324,579 | B1 | 11/2001 | Bleuse et al. |
| 6,327,707 | B1 | 12/2001 | McKeeth et al. |
| 6,330,443 | B1 | 12/2001 | Kirby |
| 6,339,790 | B1 | 1/2002 | Inoue |
| 6,405,028 | B1 | 6/2002 | DePaola et al. |
| 6,463,534 | B1 | 10/2002 | Geiger et al. |
| 6,505,246 | B1* | 1/2003 | Land et al. ................. 709/224 |
| 6,510,463 | B1 | 1/2003 | Farhat et al. |
| 6,513,060 | B1 | 1/2003 | Nixon et al. |
| 6,522,884 | B2 | 2/2003 | Tennison |
| 6,546,492 | B1 | 4/2003 | Walker et al. |
| 6,549,770 | B1 | 4/2003 | Marran |
| 6,571,290 | B2 | 5/2003 | Selgas et al. |
| 6,577,858 | B1 | 6/2003 | Gell |
| 6,578,075 | B1 | 6/2003 | Nieminen et al. |
| 6,628,775 | B1 | 9/2003 | Van Tol |
| 6,640,242 | B1 | 10/2003 | O'Neal et al. |
| 6,687,560 | B2 | 2/2004 | Kiser et al. |
| 6,748,439 | B1 | 6/2004 | Monachello et al. |
| 6,753,887 | B2 | 6/2004 | Carolan et al. |
| 6,779,004 | B1 | 8/2004 | Zintel |
| 6,792,082 | B1 | 9/2004 | Levine |
| 6,792,464 | B2 | 9/2004 | Hendrick |
| 6,985,945 | B2 | 1/2006 | Farhat et al. |
| 2001/0056485 | A1 | 12/2001 | Barrett et al. |
| 2002/0029275 | A1 | 3/2002 | Selgas et al. |
| 2002/0055909 | A1 | 5/2002 | Fung et al. |
| 2002/0114346 | A1 | 8/2002 | Lampe |
| 2002/0124078 | A1 | 9/2002 | Conrad |
| 2002/0143494 | A1 | 10/2002 | Conrad |
| 2002/0169792 | A1 | 11/2002 | Perinet et al. |
| 2003/0120465 | A1 | 6/2003 | Mets et al. |
| 2003/0120627 | A1 | 6/2003 | Emery et al. |
| 2003/0120661 | A1 | 6/2003 | Mets et al. |
| 2004/0128379 | A1 | 7/2004 | Mizell et al. |
| 2005/0021781 | A1 | 1/2005 | Sunder et al. |
| 2005/0055371 | A1 | 3/2005 | Sunder et al. |

FOREIGN PATENT DOCUMENTS

| | | |
|---|---|---|
| GB | 2378021 | 1/2003 |
| WO | WO-9966692 | 12/1999 |
| WO | WO-0002149 A1 | 1/2000 |
| WO | WO-0004434 A2 | 1/2000 |
| WO | 35256 A2 | 5/2001 |
| WO | 03/056403 A1 | 7/2003 |
| WO | 04072825 A3 | 8/2004 |
| WO | 79544 | 9/2004 |

OTHER PUBLICATIONS

Wang, Wei-Lung, et al., "A protocol for billing mobile network access devices operating in foreign networks", *Seventh IEEE International Workshops on Enabling Technologies: Infrastructure for Collaborative Enterprises, 1998. (WET ICE '98 ) Proceedings.* (Jun. 17-19, 1998),262-268.

About Fiberlink, Published by Fiberlink Communications Corp., (2001), 1 pg.

Derfler, Jr., F. J., et al., "How Network Works", *Que Corporation, Milleneum Edition,* (2000), 8 pgs.

Helmig, J., "Dialup Networking with TCP/IP", http://www.windowsnetworking.com, (Observed Aug. 4, 2005) pp. 1-19.

Landry, S., "Roaming User Profiles", http://www.engr.sc.edu/its/handouts/nt_basics/profiles.htm. (Feb. 18, 1999), 3 pgs.

Schneier, B., *Applied cryptography : protocols, algorithms, and source code in C*, New York : Wiley, 2nd ed.,(1996), pp. 37-38.

* cited by examiner

SERVICE QUALITY MONITORING PROCESS

RELATED APPLICATIONS

This application is a Continuation of U.S. application Ser. No. 10/318,968 filed Dec. 13, 2002 now U.S. Pat. No. 6,985,945, which is a Continuation of U.S. application Ser. No. 09/732,800 filed on Dec. 7, 2000, issued as U.S. Pat. No. 6,510,463, which claims the benefit of U.S. Provisional Application No. 60/207,670, filed May 26, 2000. These applications are incorporated herein by reference.

FIELD OF THE INVENTION

The present invention relates to the field of remote network connections and more particularly to monitoring the quality of network connection points.

BACKGROUND OF THE INVENTION

With the technological developments of the last decade and growing popularity of online commerce, e-mail, online chatting and the Internet in general, the demand to have constant access to these innovative technological ways of communication is rapidly increasing. Some users cannot imagine their lives without the Internet and email; some cannot imagine their lives without being able to buy groceries online. Constant desire to be connected to the informational highway increases demand for reliable, fast, convenient network connection.

Anyone using current technology has dealt with networks at some point. Being connected to a local network where users share files and data on one server is a common scheme in workplaces. However, the advantages of networks are so great that the many of people desire the ability to be connected to networks from multiple physical locations. Remote network connections provide users with opportunities 'to be connected' from many locations throughout the world with the right set of tools, e.g., computer, modem, phone line, etc. However, remote networking uses external wide area network communications links to other physical locations across town or country, and it is not always a simple task to design such a remote network access system with the acceptable performance. Busy phone line signals, unconnected modems, password problems, interrupted network connection sessions reduce the level of performance of the remote network connection and cause frustration in users. In short, the quality of network connections may vary due to a number of factors.

Thus, it would be desirable to provide a system that would reduce the above stated problems and provide high quality remote network connections.

SUMMARY OF THE INVENTION

The present invention discloses a method and system for monitoring service quality of at least one network connection point of a roaming service access system. The method includes establishing a network connection between a client device and the roaming service access system via the network connection point. The network connection point may be one of a plurality of remotely located network connection points via any one of which access to the service access system is obtainable. The method includes monitoring access performance of the network connection point to generate access performance data, and processing the access performance data thereby to monitor the service quality of the network connection point.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Although the present invention is described below by way of various embodiments that include specific structures and methods, embodiments that include alternative structures and methods may be employed without departing from the principles of the invention described herein.

In general, embodiments described below feature a network-based application that collects remote network connection performance data and modifies a priority list of network connection points based on the collected data. A preferred embodiment of the present invention features a network-based application for monitoring quality of remote network connections.

Network-related Technology

Figure 5:
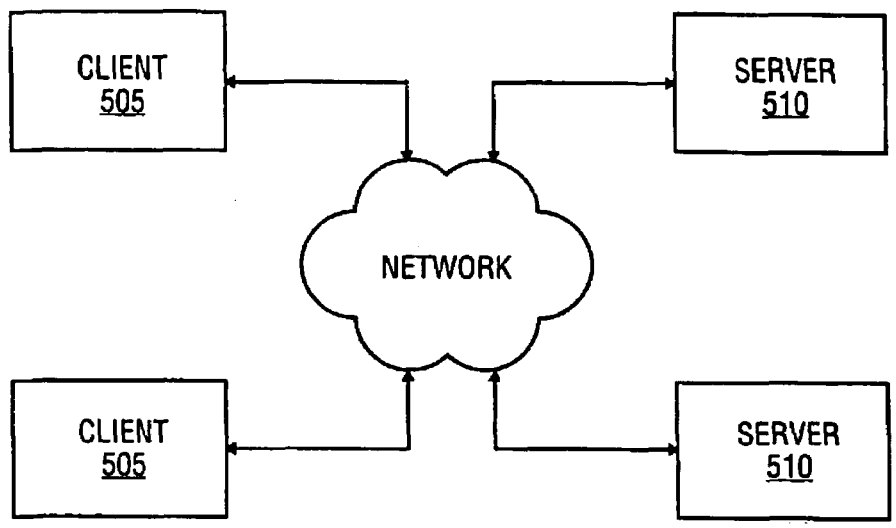
FIG. 5 a diagram of a traditional client-server system upon which one embodiment of the present invention may be implemented.

Before describing embodiments of the present invention in detail, it may be helpful to discuss some of the concepts on which the present invention is based. A component of one embodiment of the present invention is a computer server. Servers are computer programs that provide some service to other programs, called clients. A client 505 and server 510 of FIG. 5 communicate by means of message passing often over a network 500, and use some protocol, (i.e., a set of formal rules describing how to transmit data), to encode the client's requests and/or responses and the server's responses and/or requests. The server may run continually waiting for client's requests and/or responses to arrive or some higher level continually running server that controls a number of specific servers may invoke it. Client-server communication is analogous to a customer (client) sending an order (request) on an order form to a supplier (server) dispatching the goods and an invoice (response). The order form and invoice are part of the protocol used to communicate in this case.

Figure 6:
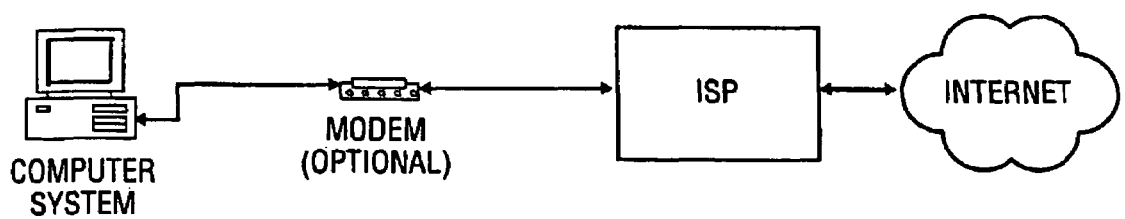
FIG. 6 is a diagram illustrating a process of connection to the Internet utilizing an Internet Service Provider (ISP) according to one embodiment of the present invention. The connection could be dial-up, IDSN, DSL, wireless, etc.

Another component of one embodiment the present invention is an Internet Service Provider (ISP). An ISP is a service that provides access to the Internet. For a monthly fee, a service provider gives a customer a software package, username, password and Internet access phone number. Equipped with a modem (e.g., a dial-up, DSL, ISDN or wireless), a customer can then log onto the Internet and browse the World Wide Web (WWW) and USENET, send and receive e-mail, and access a particular network. In addition to serving individuals, ISPs also serve large companies, providing a direct connection from the company's networks to the Internet. ISPs themselves are connected to one another through Network Access Points (NAPs). NAP is a public network exchange facility where ISPs can connect with one another in peering arrangements. The NAPs are a key component of the Internet backbone because the connections within them determine how traffic is routed. They are also the points of most Internet congestion. An exemplary diagram of customer to ISP relation is shown in FIG. 6.

ISPs generally provide a plurality of Point of Presence gateways (POP) in order for a customer to gain an Internet access by making a local call. A POP (point-of-presence) is an access point to the Internet that is associated with a phone number. A connection established via such a POP causes a unique IP address to be assigned to a machine that accesses the Internet utilizing the established connection. The number of POPs that an ISP has and the number of subscribers are usually used as a measure of its size or growth rate.

Yet another component one embodiment of the present invention is a servlet. Servlets are Java applications, which run on a Web server or application server and provide server-side processing, typically to access a database. It is a Java-based alternative to Common Gateway Interface (CGI) scripts, interface programs, usually written in C or PERL, which enables an Internet server to run external programs to perform a specific function. The most important difference between servlets and CGI scripts is that a Java servlet is persistent. This means that once it is started, it stays in memory and can fulfill multiple requests. In contrast, a CGI script disappears once it has fulfilled a request.

Architecture

Figure 1:
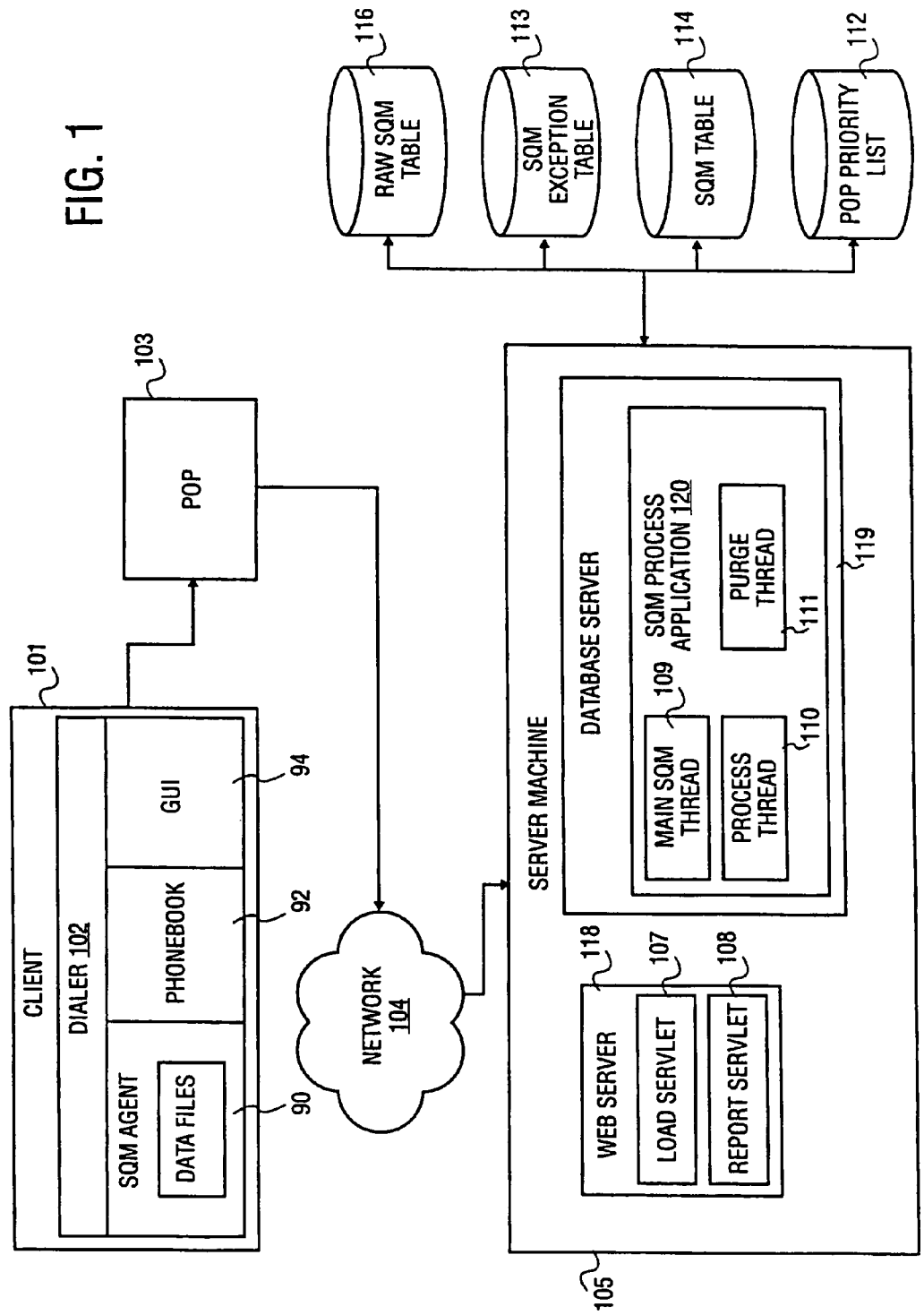
FIG. 1 is a diagram of a system architecture according to one embodiment of the present invention.

With these concepts in mind, an embodiment of a system architecture of the present invention can be explored. A remote network connection can be established from a client machine 101 of FIG. 1 that runs a dialer 102 to establish a network connection via a POP 103 and network 104 and to collect network connection performance data. The Dialer 102 includes (1) a Service Quality Management (SQM) agent 90 for collecting network connection performance data and for maintaining files storing the collected information, (2) phonebook 92, which includes a copy of a POP priority list 112 that may be stored at a server machine 105 and (3) a Graphical User Interface 94 that allows a user to identify his/her current location and select an access point in order for the Dialer 102 to apply local dialing rules, enter user name and password, and connect to the Internet and corporate Virtual Private Network (VPN).

In one embodiment of the present invention the server machine 105 includes a Web Server 118 and a Database Server 119. The Web Server 118 includes such components of the present invention as Load Servlet 107 and Report Servlet 108 database applications. The Database Server 119 includes an SQM Process Application 120 consisting of a Main SQM Thread 109, Process Thread 110 and Purge Thread 111. These components are responsible for storing and normalizing data for service quality analysis. It will be appreciated that these components may run on a single server.

In an embodiment of the present invention, database tables for storing collected and analyzed data, (e.g., Raw_SQM Table 115, SQM Table 114, POP priority list 112) are also stored at the server machine 105. However, it will be appreciated that databases may be stored at other machines and database data may be uploaded to the server machine 105 when necessary.

Methodology

Figure 2:
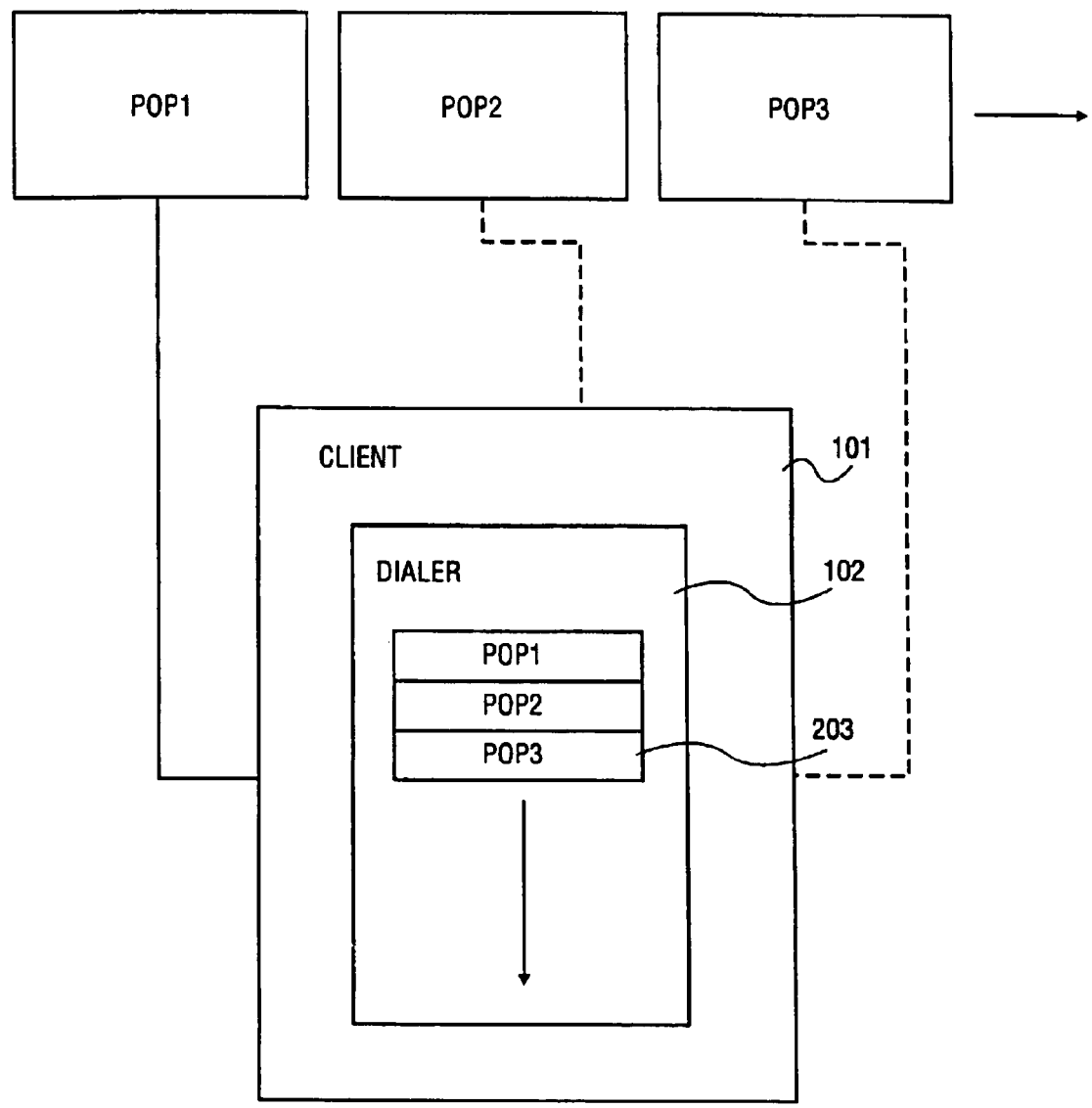
FIG. 2 is an entity relationship diagram between a client machine and a plurality of point-of-presence gateways (POPs) according to one embodiment of the present invention.

With these concepts in mind, an exemplary embodiment of the present invention can be further explored. In one embodiment of the present invention a user invokes a Dialer 102 at the client machine 101 of FIG. 2. The Dialer 102 attempts to establish a connection with one of the POPs in a priority order established in the POP priority list 203. For example, if POP1 is not available then the Dialer 102 selects the next POP (POP2) from the list and attempts to establish a network connection with POP2 and so on.

Figure 3A:
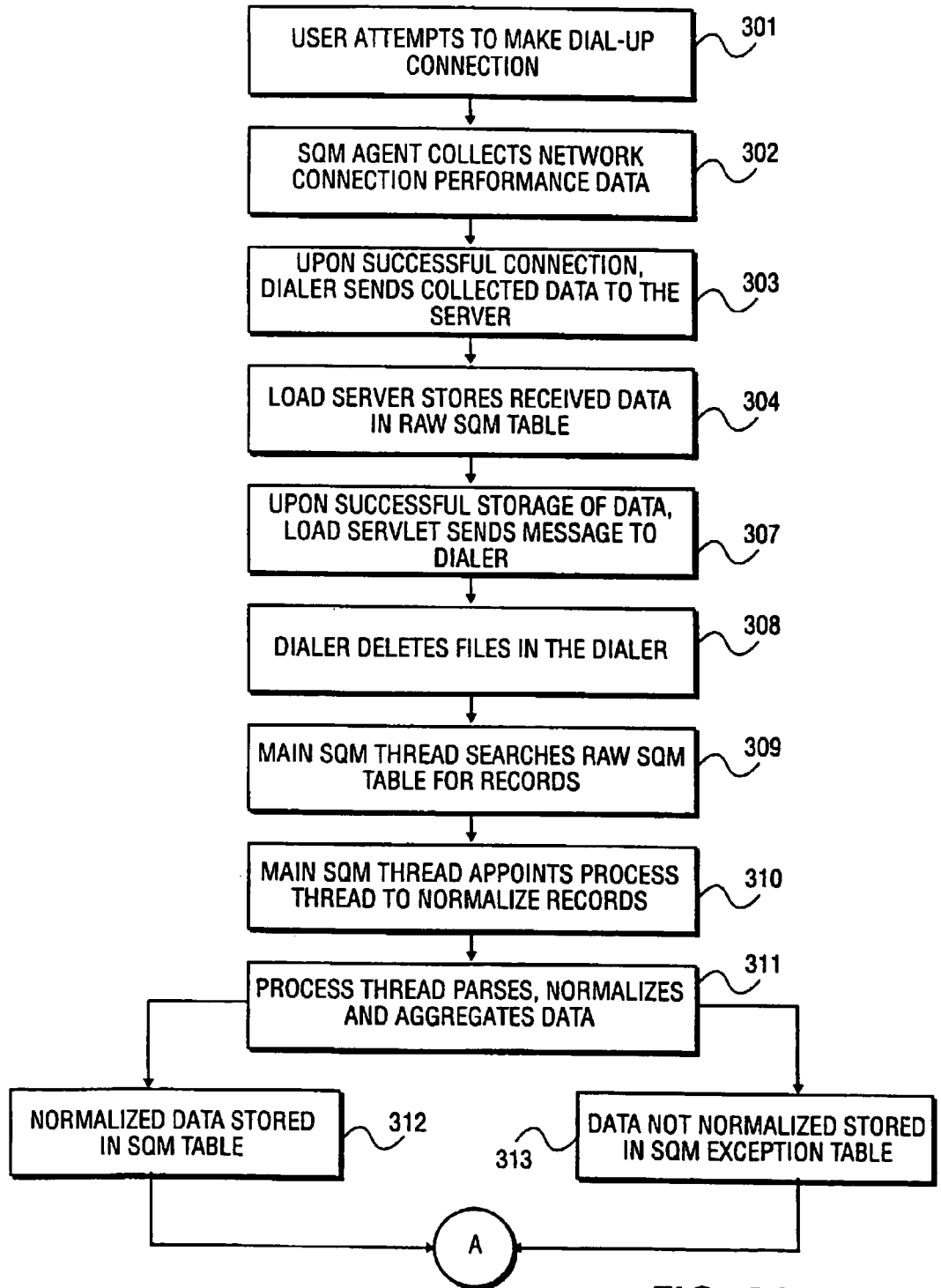
FIGS. 3A and B show a flow diagram illustrating server side processes and client side processes utilized in updating a POP priority list according to one embodiment of the present invention.
Figure 3B:
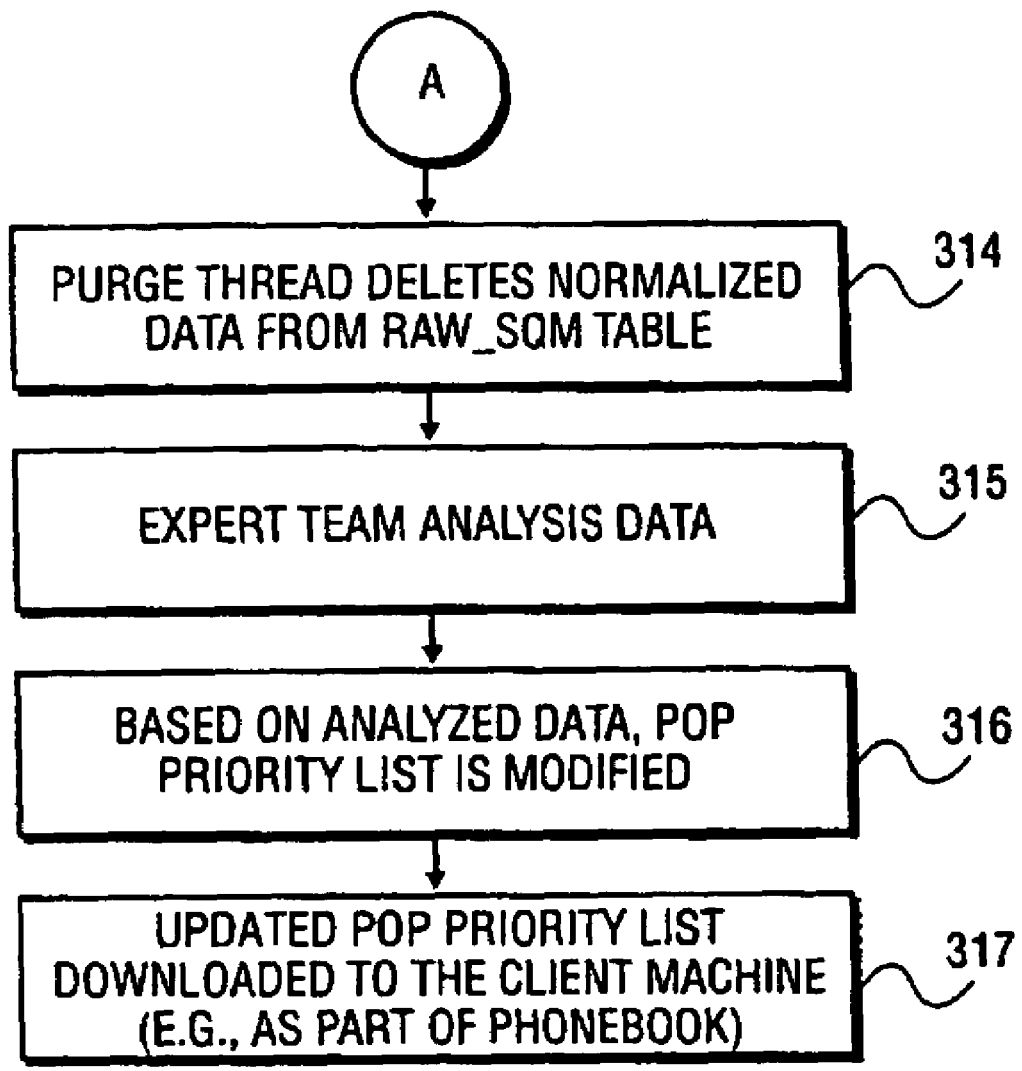

The next embodiment of the present invention is described with the reference to a simplified flow diagram shown in FIGS. 3A and 3B. At operation 302, the SQM agent 90 collects network connection performance data of a number of POPs with which the Dialer 102 attempts to establish a connection and stores the data in the files on the client machine 101. In an embodiment of the present invention, the network connection performance data includes a number of parameters related to a user, software and hardware configurations of a client machine 101, a user location, a network access location (e.g., a location dialed by modem), the timing of various operations in a connection process, POP related information, client and server IP addresses, baud rates, and error codes reflecting connection errors.

An exemplary listing of parameters that may be collected as part of the network connection performance data is provided below in Table 1:

TABLE 1 user identity
user login string
authenticating customer identifier
connection type
dial start time
dial end time
time taken to connect
VPN start time
VPN stop time
VPN time taken
time taken for modem negotiations
baud rate
operating system version of a dialing platform
RAS version
RAS device type
RAS device name
software compression
PPP LCP extensions
tool used to connect
dialer type
dialer version
dialer profile identifier
source country code, area code, location string the user is a dialing from
destination country code, area code
destination phone dial string
POP identifier
pop type
pop City location
pop state identifier
pop country code
pop phone
script used when dialing
remote server IP address
client IP address TABLE 1-continued download start (collected if test file downloaded)
download stop
download speed
error code of the user received on connection The error codes returned to the user upon a connection attempt may broadly be divided into three categories namely (1) successful dial in connection, (2) user errors and (3) network problems. The user errors typically occur due to a user name and password problems, missing or disconnected modems, incorrect dialing codes, or incorrect or hand-edited phone numbers. Examples of the user errors include:
1. Access denied due to invalid user name or password;
2. The user cancelled operation;
3. Device/configurations error (e.g., port not ready, port already opened, modem not connected, no dial tone detected); and
4. Person answered instead of modem (e.g., incorrect phone number dialed).

Examples of network errors include:
1. Line busy;
2. No answer;
3. PPP time out;
4. Connection dropped;
5. Remote access server not responding; and
6. Port disconnected by remote computer.

When a successful network connection with one of the POPs is established, the SQM agent 90 transmits the collected data to the server machine 105. In one embodiment of the present invention, the Dialer 102 selects one of the available servers for data transmission based on a data load, thus performing a load balancing function.

In one embodiment of the present invention, the SQM agent 90 collects network connection performance data relating to every POP via which it tries to establish a network connection. Upon establishment of a successful network connection with one of the POPs, the SQM agent 90 composites a message comprising network connection performance data along with software and hardware configuration data and the POP identification numbers to which the network connection performance data relates and transmits the message to the server 105.

The Web Server 118, upon receiving the collected data at the server machine 105, at operation 304 invokes the Load Servlet 107 that stores received data in the RAW SQM table 116. After the network connection performance data is successfully stored in the RAW SQM table, at operation 307 the Load Servlet 107 sends a message to the Dialer 102 at the client machine 101 with the code number symbolizing successful storage of data on the server machine 105. At operation 308, the Dialer 102 deletes data in the files stored at the client machine 101 upon receiving the message with the code number. At operation 309, the Database Server 119 invokes the SQM Process Application 120, which invokes the Main SQM Thread 109. The Main SQM Thread 109 searches RAW SQM table 116 for records, which have not been processed, and at operation 310 appoints the Process Thread 110 to normalize the data from the RAW SQM table. In one embodiment of the present invention the Process Thread 110, at operation 311, performs data normalization by parsing the data and adding a customer identification number and POP identification number to the data. The Process Thread 110 then stores normalized data in the SQM table 114 at operation 312. If the data has errors or customer identification number cannot be identified, the data is stored in an SQM Exception table 113 at operation 313.

At operation 311, the process thread may further optionally aggregate and process the normalized data, so as to facilitate convenient analysis thereof. For example, totals may be generated for particular types of errors for each of multiple POPs, averages may be generated for performance measures (e.g., baud rate), and access times may be calculated. Further, totals and averages may also be calculated based on other criteria, such as time, date and geographical criteria. The data in the SQM Exception table 113 is reviewed manually and re-processed or discarded. The Process Thread 110 marks the normalized records in the RAW SQM table 116. The Purge Thread 111 runs periodically and searches the RAW SQM table 116 for the marked records and deletes them at operation 314.

At operation 315 the data stored in the SQM table 114, reflecting POP performance information collected by multiple clients, is ready for human access. In one embodiment a data summarization process is performed on the data in the SQM table 114 to support data analysis and reporting. Multiple tables that contain summarized data are generated as a result of the summarization process that may run on a separate server. The variety of queries and reports can be generated at this point. In one embodiment of the present invention, the types of the reports that are available are: list of single POPs by phone number with the performance information, list of POP groups with the performance information on a group of POPs, end user assistance report including a variety of data on the user, e.g. quantity of dial-ins a day, number of password problems, etc., customer Service Level Agreement (SLA) performance information by month. It will be appreciated that these reports may be generated manually by human operators and automatically by components running on the server machine 105.

At operation 316 a team of experts monitors the collected network performance data and analyzes it periodically. The team's purpose is to identify the network connection problems experienced by the user and proactively respond before the remote network connection service is noticeably affected. Any suspected problems may be tested using a dialer application. A group of phone numbers, representing POPs with problematic performance, may be loaded into the dialer application for test purposes and the dialer application may dial each one in order to check POPs performance. Based on the test results and on the collected network performance data any POPs that are not performing to the quality standards may be moved to the end of the POP Priority List 112. The POP Priority List 112 may be sorted by using a number of different criteria such as quality rating, speed, price, provider, etc. These sorting criteria may be applied at an individual city level as well as on the entire phonebook level. In one embodiment manually selected sort order within a city may also be applied. The above process facilitates the identification of the best performing POPs for any given area and the assignment to such best performing POPs of a high priority number. At the same time, low performing POPs may be identified, and assigned a lower priority number. In an embodiment of the present invention if the quality of service of a POP is so poor that it is not worth maintaining in the POP Priority List 112, the expert team deletes the POP from the list temporarily until the POP's performance is improved. It will be appreciated that the analysis and POP Priority List 112 can be updated automatically without human help by developing an application that updates the POP Priority List 112 based on an advanced-specified criteria. For example, the criteria may be an acceptable average number of failed attempts to establish a network connection a day, or an acceptable number of interrupted network connection sessions, etc.

Figure 4:
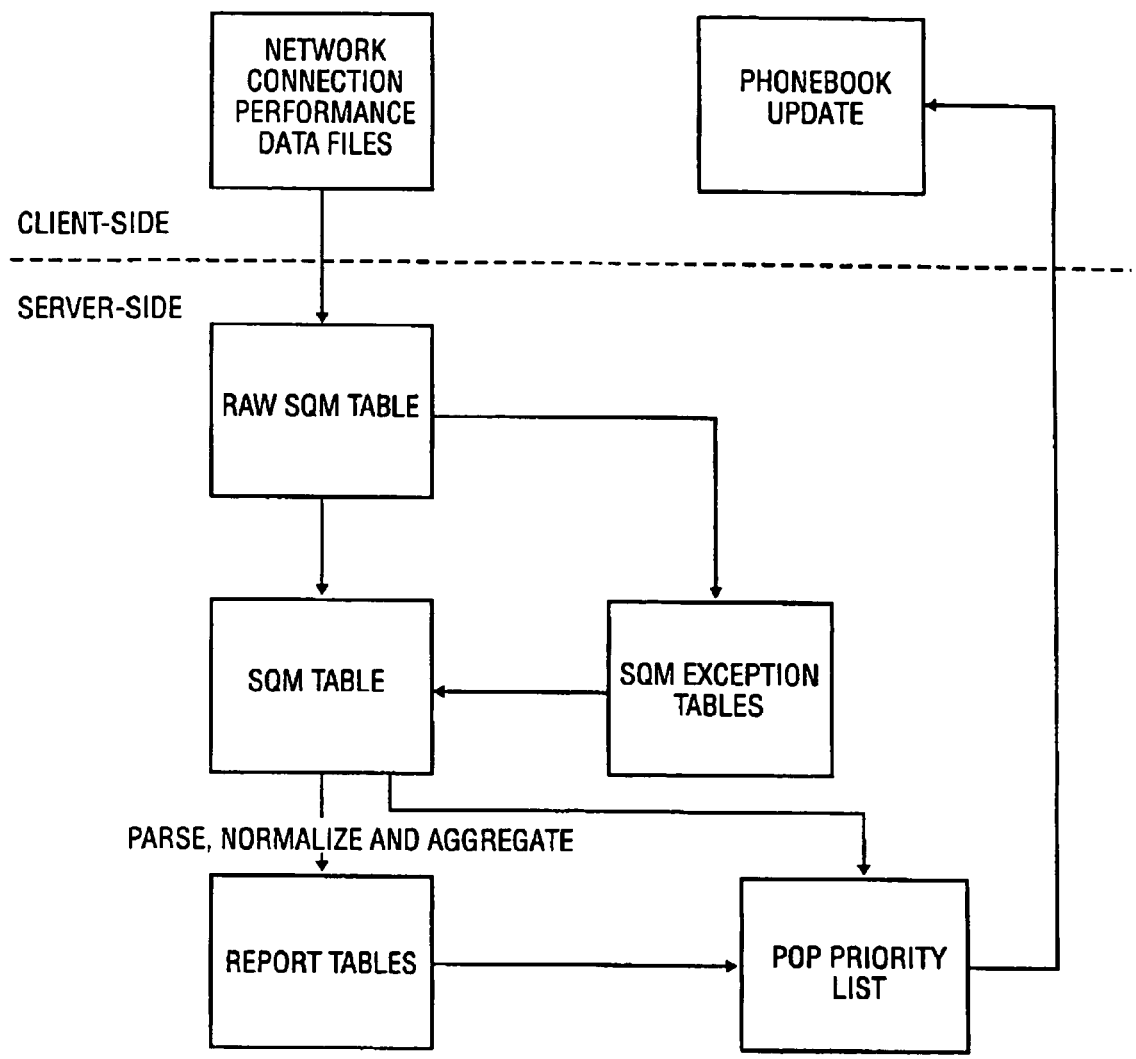
FIG. 4 is a data flow diagram according to one embodiment of the present invention.

At operation 317 the phonebook 92 on the client machine 101 is automatically updated after the user establishes a successful Internet connection. The updating of the phonebook 92 may be performed by modifying an existing phonebook 92 stored on the client machine 101, or may be performed by uploading a complete and new phonebook 92, as generated on the server machine 105, to the client machine 101. For example, upon the generation of a complete and new phonebook 92, the new phonebook 92 may be "pushed out" from the server machine 105 to multiple client machines 101. In one embodiment of the present invention, the user may choose not to receive an automatic update of the phonebook 92. In this embodiment the user may access a Web site maintained at the server machine 105 where a copy of the latest phonebook may be viewed and downloaded. An exemplary data flow diagram of the above-described process is illustrated in FIG. 4.

It will be appreciated that the operations 315–317 may be automated, with certain criteria extracted from the collected connection performance data being used automatically to prioritize POPs. Such criteria may include any of the information items identified above, and the automated process may be customizable so as to allow certain criteria to be user-selected to be prominent in the prioritization of POPs. The prioritization of POPs may be even performed according to any number of well-known ranking or prioritization algorithms.

It will be appreciated that the above described database applications do not need to run on the server machine 105. The above-described process may run on the client machine 101 with an automatic POPs performance analysis.

Moreover, the above described databases and tables do not need to be stored at the server machine 105. They may be stored at other machines that are accessible by the server machine 105 and uploaded to the server machine 105 when necessary.

In the foregoing specification the present invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for monitoring at least one network connection point of a remote network connection service, the method including:
   selecting the network connection point from a plurality of network connection points, via any one of which access to the remote network connection service is obtainable;
   at least initiating a network connection between a client device and the remote network connection service via the network connection point;
   monitoring access performance of the network connection point to generate access performance data;
   storing the access performance data; and
   prioritizing the network connection point based on the access performance data.

2. The method of claim 1, which includes:
   generating the access performance data at the client device; and
   communicating the access performance data via any one of the plurality of network connection points to a monitoring server for processing.

3. The method of claim 2, which includes generating access performance data relating to a plurality of network connection points with which the client device initiates a network connection even if no network connection is established.

4. The method of claim 3, wherein the network connection points are point-of-presence (POP) gateways and the access performance data includes a POP identifier.

5. The method of claim 2, which includes communicating the access performance data of a first network connection point to the monitoring server via a second network connection point.

6. The method of claim 1, which includes modifying connection data on the client device in response to the processing of the network performance data, the connection data being used by a connection application to select a network connection point.

7. The method of claim 6, wherein the connection data includes a plurality of telephone numbers in a connection point list, each telephone number being associated with a network connection point defined by a point-of-presence gateway (POP) providing Internet access, the method including updating the connection point list based on the monitored service quality of the selected network connection point.

8. The method of claim 1, which includes:
   prioritizing network connection points at a monitoring server wherein a higher priority level is assigned to a better performing network connection point than to a poorer performing network connection point; and
   downloading prioritized network connection points to at least one client device for subsequent use in selecting a connection point.

9. The method of claim 8, which includes storing prioritized network connection points on a Web site for downloading by any one of the plurality of client devices.

10. The method of claim 1, which includes selecting a connection point with a highest priority to establish the network connection.

11. The method of claim 10, which includes prioritizing the network connection point based on the monitoring of the network connection point.

12. The method of claim 10, which includes selecting a connection via a second network connection point from prioritized network connection points when the network connection point first selected is unavailable.

13. The method of claim 1, which includes monitoring at least one client device based connection error resulting from the client device to identify at least one apparent network connection error that is a client device based connection error.

14. The method of claim 13, wherein the client based connection error includes one of an access denial due to invalid password entry, a user cancelled access operation, a client device hardware error, and a dialed number error.

15. The method of claim 1, wherein the access performance data includes at least one network connection error including one of a line busy error, a no answer error, a PPP time out error, a connection dropped error, a roaming server non-response error, and a port disconnected by the client error.

16. The method of claim 1, wherein the access performance data includes one of connection type data, a dial start time, a dial end time, time taken to connect to the network connection point, time taken for network access negotiations, a baud rate of the network connection, a source country code, a location code, a destination country code, a download start time, a download end time, a connection dropped error, a no answer error, and no response from a network connection point.

17. The method of claim 1, which includes aggregating the access performance data.

18. The method of claim 1, which includes:
monitoring access performance at each of a plurality of prioritized network connection points provided for use by a plurality of client devices; and
modifying connection point data on the plurality of client devices in response to processing the access performance data, the connection point data being provided with prioritized network connection points.

19. The method of claim 18, wherein the connection point data includes a list of telephone numbers for use by a connect dialer.

20. A method for monitoring a network connection point of a remote network connection service, the method including:
collecting network connection performance data of the network connection point from a client device, the connection performance data being generated by the client device when a connection application on the client device establishes or attempts to establish a network connection between the client device and the network connection point, and the network connection point being selected from a plurality of remotely located network connection points, via any one of which access to the remote network connection service is obtainable;
processing the connection performance data thereby to monitor the service quality of the network connection point; and
generating an updated priority for the network connection point for communication to at least one client device, the updated priority being based on the service quality of the network connection point.

21. The method of claim 20, wherein the connection performance data indicates an error at the client device.

22. The method of claim 21, wherein the error at the client device includes any one of a user error, a software error, and a hardware error.

23. The method of claim 20, wherein the connection performance data indicates a network error.

24. The method of claim 23, wherein the network error comprises a network media error.

25. The method of claim 20, including establishing a second connection via a second network connection point selected from prioritized network connection points when connection via a first network connection point fails.

26. The method of claim 25, wherein prioritizing is based on the monitored service quality of the selected network connection point.

27. A method for monitoring a network connection point, the method including:
establishing a network connection between the a client device and the network connection point, the network connection point being selected from a plurality of remotely located network connection points via any one of which access to a remote network connection service is obtainable;
monitoring access performance of the network connection point to generate access performance data;
communicating the access performance data between the client device and a monitoring server; and
prioritizing the network connection point based on the access performance data.

28. The method of claim 27, in which the access performance data of the network connection point is communicated via any one of a plurality of network connection points to the monitoring server for processing.

29. The method of claim 27, which includes generating access performance data relating a plurality of network connection points which the client device has selected to initiate a network connection even if no network connection is established.

30. The method of claim 27, wherein the network connection points are point-of-presence (POP) gateways and the access performance data includes a POP identifier.

31. The method of claim 27, which includes modifying connection data on the client device in response to the processing of the network performance data, the connection data being used by a connection application to select a connection with the selected network connection point.

32. The method of claim 31, wherein the connection data includes a plurality of telephone numbers in a connection point list, each telephone number being associated with a network connection point defined by a point-of-presence gateway (POP) providing Internet access, the method including updating the connection point list based on the monitored service quality of the selected network connection point.

33. The method of claim 27, which includes downloading prioritized network connection points en from a Web site.

34. The method of claim 27, in which the client device selects a network connection point with a highest priority to establish the network connection.

35. The method of claim 27, in which the client device prioritizes the network connection point based on the monitored service quality of the network connection point.

36. The method of claim 27, which includes selecting a second network connection point from prioritized network connection points when the network connection point selected first is unavailable.

37. The method of claim 27, which includes monitoring at least one client based connection error resulting from the client device to identify at least one apparent network connection error that is a client based connection error.

38. The method of claim 37, wherein the client based connection error includes one of an access denial due to invalid password entry, a user cancelled access operation, a client device hardware error, and a dialed number error.

39. The method of claim 27, wherein the access performance data includes network connection error including one of a line busy error, a no answer error, a PPP time out error, a connection dropped error, a remote server non-response error, and a port disconnected by the client error.

40. The method of claim 27, wherein the access performance data includes one of a connection type data, a dial start time, a dial end time, time taken to connect to the network connection point, time taken for access negotiations, a baud rate of the network connection, a source country code, a location code, a destination country code, a download start time, a download end time, a connection dropped error, a no answer error, and no response from a network connection point.

41. The method of claim 27, which includes:
establishing the connection to the network connection point using a connection application; and downloading connection point data which is generated based on the monitored service quality of the network connection point, the connection point data being used by the connection application to select a network connection point.

42. The method of claim 41, wherein the connection point data includes a list of telephone numbers for use by a connection application in the form of a connect dialer.

43. A method for monitoring a network connection point, the method including:
receiving access performance data from a client device at a monitoring server via a network, the access performance data relating to the network connection point and being generated by the client device from a network connection between the client device and the network connection point, the network connection point being selected from a plurality of network connection points via any one of which access to a remote network connection service is obtainable;
processing the access performance data thereby to monitor the service quality of the network connection point; and
prioritizing the network connection point based on the access performance data.

44. The method of claim 43, which includes receiving access performance data relating to the plurality of network connection points via any one of a plurality of network connection points.

45. The method of claim 43, wherein the network connection points are point-of-presence (POP) gateways and the access performance data includes a POP identifier.

46. The method of claim 43, which includes providing modified connection data for the client device in response to the processing of the network performance data, the connection data being used by a connection application to select a network connection point.

47. The method of claim 46, wherein the connection data includes a plurality of telephone numbers in a connection point list, each telephone number being associated with a network connection point defined by a point-of-presence gateway (POP) providing Internet access, the method including updating the connection point list based on the monitored service quality of the network connection point.

48. The method of claim 43, which includes:
prioritizing network connection points at the monitoring server wherein a higher priority level is assigned to a better performing network connection point than to a poorer performing network connection point; and
providing prioritized network connection points for downloading to at least one client device for subsequent use in selecting a network connection point.

49. The method of claim 48, which includes storing prioritized network connection points on a Web site for downloading by any one of a plurality of client devices.

50. The method of claim 43, in which the access performance data includes at least one client based connection error resulting from the client device to identify at least one apparent network connection error that is a client based connection error.

51. The method of claim 50, wherein the client based connection error includes one of an access denial due to invalid password entry, a user cancelled access operation, a client device hardware error, and a dialed number error.

52. The method of claim 43, wherein the access performance data includes at least one network connection error including a line busy error, a no answer error, a PPP time out error, a connection dropped error, a remote server non-response error, and a port disconnected by the client error.

53. The method of claim 43, wherein the access performance data includes one of a connection type data, a dial start time, a dial end time, time taken to connect to the network connection point, time taken for access negotiations, a baud rate of the network connection, a source country code, a location code, a destination country code, a download start time, a download end time, a connection dropped error, a no answer error, and no response from a network connection point.

54. The method of claim 43, which includes aggregating the access performance data.

55. The method of claim 43, wherein the connection point data includes a list of telephone numbers for use by a connect dialer.

56. The method of claim 43, including downloading prioritized network connection points to be utilized by the client device in selecting a network connection point.

57. The method of claim 43, wherein the prioritizing of network connection points further includes assigning a higher priority level to a better performing network connection point.

58. A machine-readable storage medium including instructions that, when executed on a machine, cause the machine to execute a method for monitoring at least one network connection point, the method including:
selecting the network connection point from a plurality of remotely located network connection points via any one of which access to a remote network connection service is obtainable;
at least initiating a network connection between a client device and the selected network connection point;
monitoring access performance of the selected network connection point to generate access performance data;
communicating the access performance data between the client device and a monitoring server; and
prioritizing the selected network connection point based on the access performance data.

59. A machine-readable storage medium including instructions that, when executed on a machine, cause the machine to execute a method for monitoring a network connection point, the method including:
receiving access performance data from a client device at a monitoring server via a network, the access performance data relating to the network connection point and being generated from a network connection between the client device and the network connection point, the network connection point being selected from a plurality of network connection points via any one of which access to a remote network connection service is obtainable;
processing the access performance data; and
prioritizing the network connection point based on the access performance data.

60. A system for monitoring a network connection point of a roaming service access system, the system including:
a client device to select and establish a network connection between the client device and the remote network connection service via the network connection point, the network connection point being one of a plurality of remotely located network connection points via any one of which access to the remote network connection service is obtainable and the client device monitoring access performance of the network connection point and storing access performance data; and a server to receive the access performance data related to the network connection point, the server being to prioritize the network connection point based on the access performance data.

61. The system of claim 60, in which the access performance data is generated at the client device and communicated to the server for processing via any one of a plurality of network connection points.

62. The system of claim 60, in which the client device generates access performance data relating a plurality of network connection points with which the client device initiates a network connection even if no network connection is established.

63. A client device for monitoring a network connection point at the client device, the client device including:
   a connection module to select and establish a network connection between the client device and the selected network connection point, the selected network connection point being one of a plurality of remotely located network connection points via any one of which access to a remote network connection service is obtainable;
   a monitoring module to monitor application access performance of the network connection point to generate access performance data; and
   a communication module to communicate the access performance data to a server to prioritize the network connection point based on the access performance data, and to receive a prioritized network connection points.

64. The system of claim 63, in which the access performance data of the network connection point is communicated to the server for processing via any one of a plurality of network connection points.

65. The system of claim 63, wherein the network connection points are point-of-presence (POP) gateways and the access performance data includes a POP identifier.

66. A system for monitoring a network connection point of a remote network connection service, the system including:
   means for selecting and establishing a network connection between a client device and the remote network connection service via the network connection point, the network connection point being one of a plurality of remotely located network connection points via any one of which access to the service access system is obtainable;
   means provided at the client device for monitoring access performance of the network connection point to generate access performance data and storing the access performance data at the client device; and
   means for processing the access performance data thereby to prioritize the network connection point based on the access performance data.

67. A computer-implemented method comprising:
   attempting to establish a first network connection through a first access point;
   determining that the first network connection failed;
   establishing a second network connection through a second access point; and
   transmitting, over the second network connection, information indicating that a connection attempt through the first access point failed.

68. The computer-implemented method of claim 67 further comprising:
   choosing the first access point and the second access point based at least in part on a first priority list of access points.

69. The computer-implemented method of claim 68 further comprising:
   receiving a second priority list of access points, wherein the second priority list of access points was created based at least in part on the information indicating that the connection attempt through the first access point failed, and wherein a priority of the first access point in the first priority list of access points is higher than a priority of the first access point in the second list of access points.

70. The computer-implemented method of claim 67, wherein the information indicating that the connection attempt through the first access point failed includes information selected from the group consisting of a line busy indication, a no answer indication, a timeout indication, a connection dropped indication, a non-responsive server indication, and a port disconnection indication.

71. A computer-implemented method comprising:
   transmitting a first set of priority data indicating connection priority of ones of a set of access points, wherein the first set of priority data is for use by ones of a plurality of clients in determining which of the set of access points should be used to make a network connection;
   receiving network connection performance data associated with ones of the set of access points, wherein the network connection performance data was generated by ones of the plurality of clients;
   generating, based at least in part on the network connection performance data, a second set of priority data indicating connection priority of ones of the set of access points; and
   transmitting the second set of priority data, wherein the second set of priority data is for use by ones of a plurality of clients in determining which of the set of access points should be used to make a network connection.

72. The computer-implemented method of claim 71, wherein the network connection performance data includes data selected from the group consisting of indications of successful connections, indications of unsuccessful connections due to user error, and indications of unsuccessful connections due to network problems.

73. The computer-implemented method of claim 71, wherein the generating of the second set of priority data includes processing the network connection performance data, wherein the processing includes operations selected from the group consisting of tracking errors for each of the set of access points, generating averages for performance measures, generating averages for access times, generating totals or averages based on time, generating totals or averages based on a date, and generating totals or averages based on geographic criteria.

\* \* \* \* \*

UNITED STATES PATENT AND TRADEMARK OFFICE
CERTIFICATE OF CORRECTION

PATENT NO.       : 7,240,112 B2                                                Page 1 of 1
APPLICATION NO.  : 11/126008
DATED            : July 3, 2007
INVENTOR(S)      : Farhat et al.

It is certified that error appears in the above-identified patent and that said Letters Patent is hereby corrected as shown below:

On page 2, in field (56), under "Other Publications", in column 2, line 9, delete "Milleneum" and insert -- Millenium --, therefor.

On page 2, in field (56), under "Other Publications", in column 2, line 11, after "2005)" insert -- , --.

On sheet 4 of 6, in FIG. 3B (Reference Numeral 314), line 2, delete "RAW_SQM" and insert -- RAW SQM --, therefor.

In column 4, lines 2-3, delete "RAW_SQM Table 115," and insert -- RAW SQM Table 116, --, therefor.

In column 9, line 60, in Claim 27, after "between" delete "the".

In column 10, line 32 (Approx.), in Claim 33, after "points" delete "en".

In column 13, line 29, in Claim 63, after "receive" delete "a".

Signed and Sealed this

Twentieth Day of November, 2007

JON W. DUDAS
*Director of the United States Patent and Trademark Office*